(12) United States Patent
Fukuhara (10) Patent No.: US 10,147,976 B2
(45) Date of Patent: Dec. 4, 2018

(54) INSULATING CONTAINER FOR BATTERY, BATTERY CONTROL DEVICE, AND BATTERY-FAILURE DETECTION METHOD

(71) Applicant: NGK Insulators, Ltd., Nagoya (JP)

(72) Inventor: Motohiro Fukuhara, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 176 days.

(21) Appl. No.: 14/564,529

(22) Filed: Dec. 9, 2014

(65) Prior Publication Data

US 2015/0147607 A1 May 28, 2015

Related U.S. Application Data

(63) Continuation of application No. PCT/JP2013/056851, filed on Mar. 12, 2013.

(30) Foreign Application Priority Data

Jun. 15, 2012 (JP) ................................. 2012-136203

(51) Int. Cl.
*H01M 10/42* (2006.01)
*H01M 10/615* (2014.01)
(Continued)

(52) U.S. Cl.
CPC ....... *H01M 10/4228* (2013.01); *G01M 3/186* (2013.01); *H01M 2/1088* (2013.01);
(Continued)

(58) Field of Classification Search
CPC ........... H01M 10/4228; H01M 10/615; H01M 10/6571; H01M 10/658; H01M 2/1088;
(Continued)

(56) References Cited

U.S. PATENT DOCUMENTS 5,824,883 A 10/1998 Park et al.
6,337,559 B1 1/2002 Sato
(Continued)

FOREIGN PATENT DOCUMENTS

EP 1 722 217 A1 11/2006
JP 03-158781 A1 7/1991
(Continued)

OTHER PUBLICATIONS

Machine translation of Kawaguchi et al. (JP 11162507 A).*
(Continued)

*Primary Examiner* — Sarah A. Slifka
*Assistant Examiner* — Brian R Ohara
(74) *Attorney, Agent, or Firm* — Burr & Brown, PLLC (57) ABSTRACT

A battery assembly heat insulating container includes a box body and a lid body. The box body has an opening on its upper surface, and contains a battery module formed by connecting a plurality of battery cells in series or in parallel. The lid body is placed on the upper surface of the box body. The battery assembly heat insulating container is adapted to provide heat insulation between an external space and an internal space formed by the box body and the lid body and configured to contain the battery module. A circuit member configured to detect leakage of active material from the battery module is provided at the bottom of the box body.

6 Claims, 9 Drawing Sheets

(51) Int. Cl.
    *H01M 10/6571*    (2014.01)
    *H01M 10/658*     (2014.01)
    *H01M 10/39*      (2006.01)
    *H01M 10/48*      (2006.01)
    *H01M 2/10*       (2006.01)
    *G01M 3/18*       (2006.01)

(52) U.S. Cl.
    CPC ..... *H01M 2/1094* (2013.01); *H01M 10/3909* (2013.01); *H01M 10/4257* (2013.01); *H01M 10/482* (2013.01); *H01M 10/615* (2015.04); *H01M 10/658* (2015.04); *H01M 10/6571* (2015.04); *H01M 2010/4271* (2013.01)

(58) Field of Classification Search
    CPC ........... H01M 2/1094; H01M 10/3909; H01M 10/4257; H01M 10/482; H01M 2010/4271; G01M 3/186
    See application file for complete search history.

(56) References Cited

U.S. PATENT DOCUMENTS

| | | | |
|---|---|---|---|
| 6,958,197 B2 | 10/2005 | Tamakoshi | |
| 8,088,331 B2* | 1/2012 | Ueda | H01M 10/48 |
| | | | 422/50 |
| 8,667,979 B1* | 3/2014 | Frazier | G01M 3/04 |
| | | | 137/15.01 |
| 2005/0116725 A1* | 6/2005 | Raymond | G01M 3/165 |
| | | | 324/693 |
| 2007/0275296 A1* | 11/2007 | Ueda | H01M 10/48 |
| | | | 429/61 |
| 2012/0251859 A1* | 10/2012 | Payne | H01M 2/1077 |
| | | | 429/90 |

FOREIGN PATENT DOCUMENTS

| | | |
|---|---|---|
| JP | 10-115569 A1 | 5/1998 |
| JP | 11162507 A * | 6/1999 |
| JP | 11162507 A * | 6/1999 |
| JP | 2000-048857 A1 | 2/2000 |
| JP | 2000-243435 | 9/2000 |
| JP | 2001-084996 A1 | 3/2001 |
| JP | 2002-260724 A1 | 9/2002 |
| JP | 2003-151620 A1 | 5/2003 |
| JP | 2003-288950 A1 | 10/2003 |
| JP | 3693983 B2 | 9/2005 |
| JP | 2005-293881 A1 | 10/2005 |
| WO | 98/32186 A1 | 7/1998 |
| WO | 2010/064753 A1 | 6/2010 |

OTHER PUBLICATIONS

Machine translation of Kawaguchi et al. (JP 11162507 A1) (Year: 1999).*
International Search Report and Written Opinion (Application No. PCT/JP2013/056851) dated Jun. 25, 2013.
Extended European Search Report (Application No. 13803851.8) dated Dec. 17, 2015.
Japanese Office Action (Application No. 2014-520972) dated Aug. 9, 2016 (with partial English translation).

* cited by examiner

INSULATING CONTAINER FOR BATTERY, BATTERY CONTROL DEVICE, AND BATTERY-FAILURE DETECTION METHOD

CROSS-REFERENCE TO RELATED APPLICATIONS

This application is a Continuation of International Application No PCT/JP2013/056851 filed on Mar. 12, 2013, which is based upon and claims the benefit of priority from Japanese Patent Application No 2012-136203 filed on Jun. 15, 2012, the contents all of which are incorporated herein by reference.

TECHNICAL FIELD

The present invention relates to a battery assembly heat insulating container (insulating container for battery), a battery assembly control device (battery control device), and a battery assembly failure detection method (battery-failure detection method) applied to a battery assembly formed by connecting a large number of battery cells, and operated at high temperature.

BACKGROUND ART

A sodium-sulfur battery (hereinafter referred to as the NaS battery) is a high temperature secondary battery containing metal sodium and sulfur as active materials in an isolated manner using a solid electrolyte tube. When the NaS battery is heated at high temperature of about 300° C. a certain amount of energy is produced by an electrochemical reaction of both of the melted active materials. Normally, the NaS battery is formed by assembling a plurality of battery cells upright, and used in a form of a battery module including a plurality of battery cells connected together. That is, the battery module is a battery assembly where circuits (strings) each formed by connecting a plurality of battery cells in series are connected in parallel to form a block, and at least two blocks are connected in series.

The battery assembly heat insulating container is intended to maintain the high temperature state of the battery module operated at high temperature such as the Nas battery, and used for heat insulation between the internal space containing the battery module and the external space. In consideration of ease of assembling or handling, in general, the battery assembly heat insulating container adopts box shape structure including a box body having an opening on its upper surface and a lid body placed on the upper surface of the box body. The box body contains a battery module operated at high temperature (for example, see Japanese Patent No. 3693983).

Further, in order to realize such operation suitably, in the NaS battery, the battery assembly control device includes a module control device provided independently for each battery module and general-purpose equipment such as a sequencer. Each module control device measures the operating voltage and the operating temperature of each battery module, monitors the operating state, and regulates the operating temperature of the NaS battery by turning on/off a heater provided for each battery module. Further, by the current measurement function of the sequencer, for example, the electric discharging current of the NaS battery is measured to calculate the voltage drop in the sequencer, and discharge cut off voltage is determined so as to detect the end of electric discharging (depth of discharge) of the NaS battery (for example, see Japanese Laid-Open Patent Publication No. 2003-288950). The cut off voltage herein means voltage used as a reference in determining the end of electric charging or the end of electric discharging of the NaS battery.

Further, as a method of detecting a failure of the battery module (e.g., failure in each block), a method of detecting a failure of a battery module by comparing the depth of discharge in each block is disclosed (e.g., see Japanese Laid-Open Patent Publication No. 03-158781). In this method, the presence of the failure in the battery is considered for each of the blocks of the battery module. Therefore, in comparison with the method of detecting a failure in each of NaS battery cells forming the block, the apparatus is not complicated, and the production cost is reduced. In these respects, this failure detection method is advantageous.

SUMMARY OF INVENTION

It is considered that failures in the battery cells, and consequently, failures in the modules are caused by internal short circuiting or external short circuiting in the battery cells.

For example, external short circuiting of the battery cells may be caused by formation of an external short circuiting loop due to leakage of active material in the battery cells. For example, internal short circuiting of the battery cells may be caused by damages, etc. of a beta tube.

External short circuiting and internal short circuiting of these battery cells can be detected by checking the above described depth of discharge in each block. However, changes in the depth of discharge due to short circuiting do not occur rapidly, but occur gradually over a relatively long period of time. Therefore, if the detection accuracy is low, there is a risk that initial response to the occurrence of a failure may be delayed undesirably.

In an attempt to address the problem, it may be possible to improve the accuracy of detecting changes in the depth of discharge. Further, it is desired to provide a battery assembly heat insulating container, a battery assembly control device, and a battery assembly failure detection method which make it possible to easily realize a scheme which is different from the scheme of detecting changes in the depth of discharge in each block.

The present invention has been made to take the problems of this type into account, and an object of the present invention is to provide a battery assembly heat insulating container and a battery assembly control device which have structure of easily detecting the presence of battery cells having leakage of active material, and which make it possible to easily realize a scheme which is different from the scheme of detecting changes in the depth of discharge in each block.

Further, an object of the present invention is to provide a battery assembly failure detection method which makes it possible to detect the presence of battery cells having leakage of active material in real time, and which makes it possible to avoid the risk of the delay in the initial response to the occurrence of a failure.

[1] According to a first aspect of the present invention, a battery assembly heat insulating container is provided. The battery assembly heat insulating container includes a box body having an opening on an upper surface of the box body and a lid body placed on the upper surface of the box body. The battery assembly is formed by connecting a plurality of battery cells in series or in parallel. The battery assembly heat insulating container is adapted to provide heat insulation between an external space and an internal space being formed by the box body and the lid body and containing the battery assembly. A circuit member configured to detect leakage of active material from the battery assembly is provided at a bottom of the box body.

In the structure, it is possible to easily detect the presence of battery cells having leakage of active material, and easily realize a scheme which is different from the scheme of detecting changes in the depth of discharge in each block. Consequently, it is possible to detect the presence of battery cells having leakage of active material, and avoid the risk of the delay in the initial response to the occurrence of a failure.

[2] In the first aspect of the present invention, the circuit member may have at least one lead wire wired separately from a heater wire. In the structure, if the resistance value of the lead wire is measured and there is a change in the resistance, it is proven that a failure has occurred in one or more battery cells due to leakage of active material.

[3] Further, preferably, the lead wire is spread over an entire graphic pattern formed by projecting at least the battery assembly on the bottom of the box body. In this manner, among the plurality of battery cells of the battery assembly, it is possible to easily detect the presence of battery cells having leakage of active material.

[4] Further, preferably, the lead wire is spread in a comb teeth pattern. By providing the lead wire in a comb teeth pattern, the lead wire also functions as a resistance wire. In the structure, resistance changes due to contact of active material become large, and it is possible to detect the presence of battery cells having leakage of active material at an early stage.

[5] Further, the circuit member may have a first insulating layer stacked on the heater wire for allowing the lead wire to be placed on the first insulating layer and a second insulating layer stacked on the lead wire, and a plurality of holes may extend through the second insulating layer from the internal space containing the battery assembly to the lead wire. In the structure, if leakage of active material from one or more battery cells occurs, the leaked active material passes through the holes of the second insulating layer to reach the lead wire. Therefore, it is possible to easily detect the presence of battery cells having leakage of active material.

[6] Further, the circuit member may include a first lead wire and a second lead wire both spread in a comb teeth pattern, and comb teeth of the second lead wire may be positioned between adjacent comb teeth of the first lead wire. Therefore, for example, by determining the pitches of the comb teeth of the first lead wire and the comb teeth of the second lead wire to be equal to or less than twice the arrangement pitch of the battery cells, the interval between the comb teeth of the first lead wire and the comb teeth of the second lead wire that are adjacent to one another in a plan view becomes equal to or less than the arrangement pitch of the battery cells. Consequently, even if a failure occurred in only one battery cell due to leakage of active material, it becomes possible to detect the battery cell having the failure reliably, and in real time.

[7] Further, the circuit member may include a first lead wire and the second lead wire both spread in a comb teeth pattern, and orientation of comb teeth of the first lead wire may be different from orientation of comb teeth of the second lead wire. Also in this case, even if a failure occurred in only one battery cell due to leakage of active material, it becomes possible to detect the battery cell having the failure reliably, and in real time.

[8] Further, the circuit member may include a first insulating layer stacked on the heater wire and configured to allow the first lead wire to be placed on the first insulating layer, a second insulating layer stacked on the first lead wire and configured to allow the second lead wire to be placed on the second insulating layer, and a third insulating layer stacked on the second lead wire. A plurality of holes may extend through the third insulating layer from the internal space containing the battery assembly to the second lead wire, and a plurality of holes may extend through the second insulating layer from the second lead wire to the first lead wire.

In the structure, if leakage of active material occurs in one or more battery cells, the leaked active material passes through the holes of the third insulating layer to reach the second lead wire, or the leaked active material passes through the holes of the third insulating layer and the holes of the second insulating layer to reach the first lead wire, or the leaked active material passes through the holes of the third insulating layer to reach the second lead wire, and thereafter, passes through the holes of the second insulating layer to reach the first lead wire. Therefore, it is possible to easily detect the presence of battery cells having leakage of active material.

[9] According to a second aspect of the present invention, a battery assembly control device for a battery assembly is provided. The battery assembly is formed by connecting a plurality of battery cells in series or in parallel, and the battery assembly is placed in a battery assembly heat insulating container containing a heater wire therein. The battery assembly control device includes an active material leakage detection unit configured to detect leakage of active material from the battery assembly. In the battery assembly heat insulating container, the active material leakage detection unit includes at least one lead wire placed in the battery assembly heat insulating container and wired separately from the heater wire, a resistance measurement unit configured to measure a resistance value of the lead wire, and a leakage determination unit configured to output a leakage detection signal indicating presence of leakage of active material from the battery assembly on condition that there is a change in a resistance value measured by the resistance measurement unit.

In the structure, it is possible to easily detect the presence of battery cells having leakage of active material, and easily realize a scheme which is different from the scheme of detecting changes in the depth of discharge in each block. Consequently, it is possible to detect the presence of battery cells having leakage of active material in real time, and avoid the risk of the delay in the initial response to the occurrence of a failure.

[10] In the second aspect of the present invention, the battery assembly heat insulating container may contain a first lead wire and a second lead wire that are wired separately from the heater wire, the resistance measurement unit may measure a resistance value of the first lead wire and a resistance value of the second lead wire, and the leakage determination unit may output the leakage detection signal on condition that there is a change in any one or more of the resistance value of the first lead wire, the resistance value of the second lead wire, and a difference between the resistance value of the first lead wire and the resistance value of the second lead wire.

[11] According to a third aspect of the present invention, a battery assembly failure detection method is provided. The battery assembly failure detection method detects a failure in a battery assembly formed by connecting a plurality of battery cells in series or in parallel. The battery assembly is placed in a battery assembly heat insulating container containing a heater wire therein. The battery assembly heat insulating container contains therein at least one lead wire wired separately from the heater wire. The battery assembly failure detection method includes a first step of measuring a resistance value of the lead wire, and a second step of outputting a signal indicating presence of leakage of active material from the battery assembly on condition that there is a change in the measured resistance value.

As described above, the battery assembly heat insulating container and the battery assembly control device according to the present invention have structure of easily detecting the presence of battery cells having leakage of active material, and can easily realize a failure detection scheme which is different from the scheme of detecting changes in the depth of discharge in each block.

Further, in the battery assembly failure detection method according to the present invention, it is possible to detect the presence of battery cells having leakage of active material in real time, and avoid the risk of the delay in the initial response to the occurrence of a failure.

The above and other objects, features, and advantages of the present invention will become more apparent from the following description when taken in conjunction with the accompanying drawings in which preferred embodiments of the present invention are shown by way of illustrative example.

DESCRIPTION OF EMBODIMENTS

Hereinafter, a heat insulating container for a battery assembly (referred to as the battery assembly heat insulating container), a control device for the battery assembly (referred to as the battery assembly control device), and a failure detection method for the battery assembly (referred to as the battery assembly failure detection method) according to the present invention, e.g., applied to a NaS battery will be described with reference to FIGS. 1 to 9.

Figure 1:
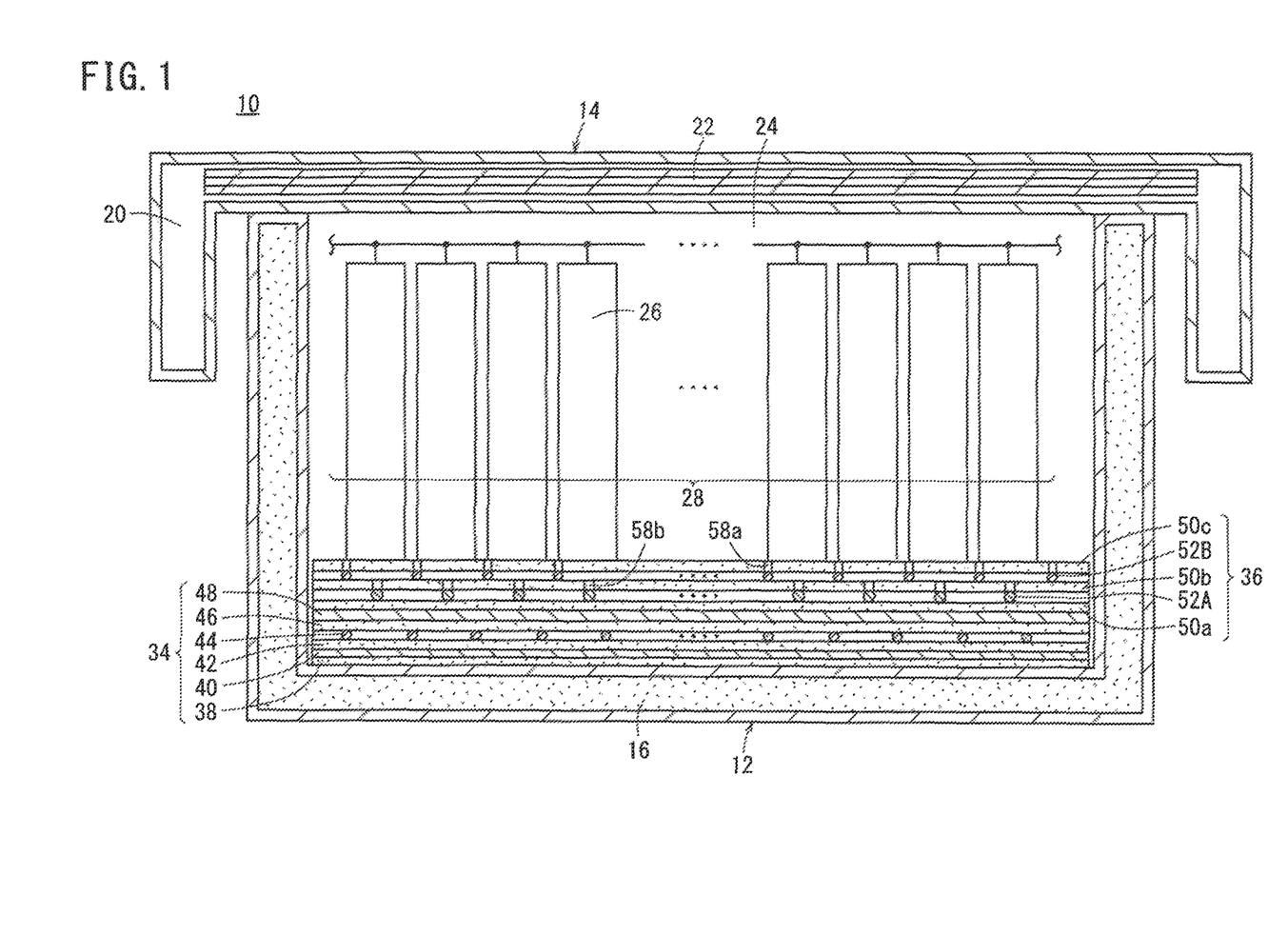
FIG. 1 is a vertical sectional view showing structure of a battery assembly heat insulating container according to an embodiment of the present invention.

Firstly, as shown in FIG. 1, the battery assembly heat insulating container according to the present embodiment (hereinafter referred to as the heat insulating container 10) includes a box body 12 having an opening on its upper surface and a lid body 14 placed on the upper surface of the box body 12.

The box body 12 is formed of a plate member of, e.g., stainless steel, and formed in a box shape having a hollow area. The hollow area is a space sealed in an air-tight manner. The hollow area is configured to be connectable to an external space through a vacuum valve (not shown). A porous vacuum heat insulating board 16 formed by solidifying glass fiber in a plate shape using adhesive fills the hollow area to provide vacuum heat insulating structure for the box body 12.

In the same manner as in the case of the box body 12, the lid body 14 is formed of a plate member of, e.g., stainless steel. A heat insulating material layer for achieving the required minimum heat insulating property is placed on an inner surface (lower surface) of the lid body 14, and at least two stacked detachable heat insulating plates 22 are filled in a hollow area 20 to provide air heat insulating structure only in the lid body 14 (upper surface). In the structure, the amount of heat radiation from the upper surface of the heat insulating container 10 can be controlled.

A battery module 28 (battery assembly) formed by connecting a plurality of battery cells 26 in series and/or in parallel upright is placed in an internal space 24 of the heat insulating container 10 formed by the box body 12 and the lid body 14. In order to suppress damages and abnormal heating of the battery cells 26 or leakage of active material, etc., though not shown, as fire extinction sand, silica sand fills a gap between the box body 12 and the battery module 28.

Figure 2:
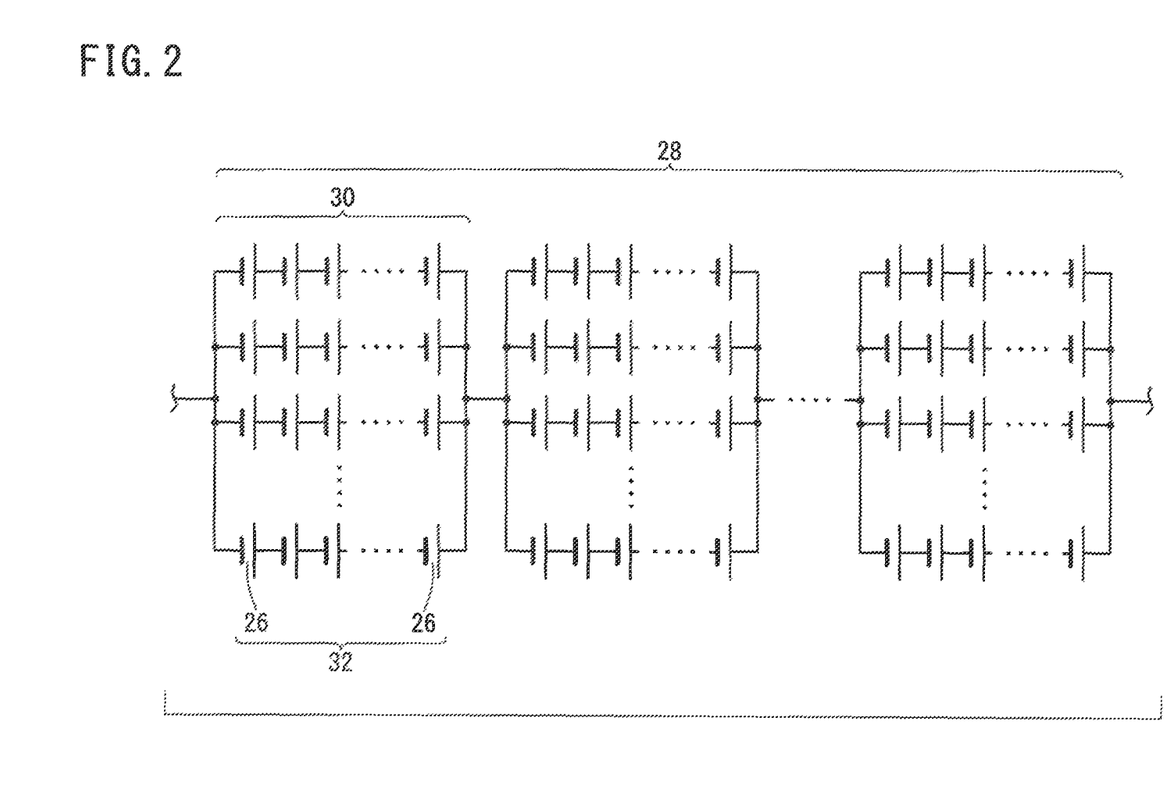
FIG. 2 is an equivalent circuit diagram showing a battery module.

As shown in FIG. 2, the battery module 28 is formed by connecting two or more blocks 30 in series. Each of blocks 30 is formed by connecting two or more circuits (strings 32) in parallel, and each of the strings 32 is formed by connecting two or more battery cells 26 in series. For example, eight battery cells 26 are connected in series to form one string 32, and twelve strings 32 are connected in parallel to form one block 30, and four blocks 30 are connected in series to form one battery module 28.

Further, at the bottom of the box body 12 of the heat insulating container 10, a heater member 34 for heating the battery module 28 at high temperature and a circuit member 36 stacked on the heater member 34, for detecting leakage of active material from the battery module 28, are provided.

Figure 3:
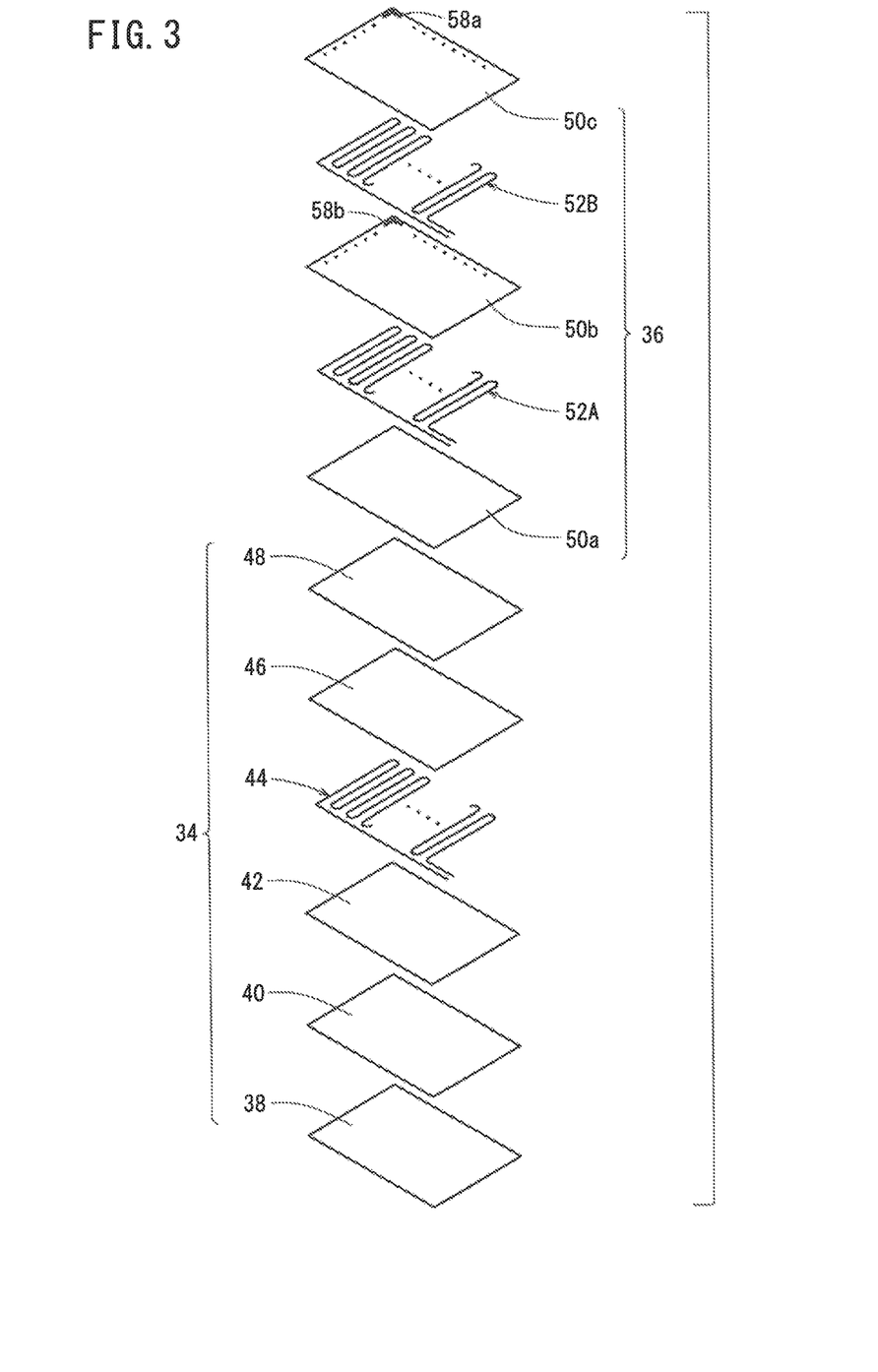
FIG. 3 is an exploded perspective view showing stack structure of a heater member and a circuit member.
Figure 4:
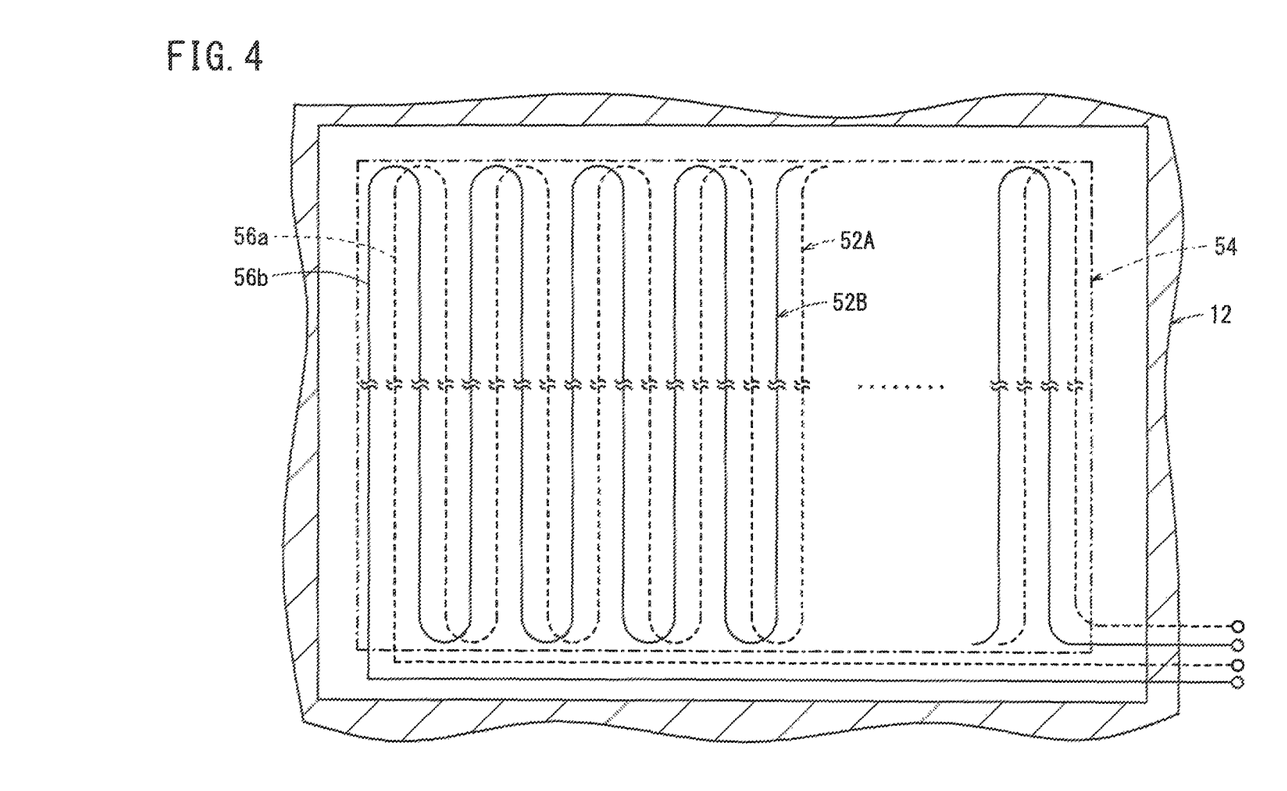
FIG. 4 is a view showing an example of a wiring pattern a first lead wire and a second lead wire.

As also shown in FIG. 3, the heater member 34 includes a lower insulating layer 38 as a lowermost layer, a lower soaking plate 40 stacked on the lower insulating layer 38, an intermediate insulating layer 42 stacked on the lower soaking plate 40, a heater wire 44 stacked on the intermediate insulating layer 42, an upper insulating layer 46 stacked on the heater wire 44, and an upper soaking plate 48 stacked on the upper insulating layer 46. For these insulating layers, for example, electrically insulating mica sheets, etc. may be used. For these soaking plates, for example, aluminum plates, etc. may be used.

The circuit member 36 includes a first insulating layer 50a stacked on the upper soaking plate 48 of the heater member 34, a first lead wire 52A stacked on the first insulating layer 50a, a second insulating layer 50b stacked on the first lead wire 52A, a second lead wire 52B stacked on the second insulating layer 50b, and a third insulating layer 50c stacked on the second lead wire 52B. The battery module 28 is fixedly placed on the third insulating layer 50c. As in the case of the heater member 34, for example, mica sheets may be used for the first insulating layer 50a, the second insulating layer 50b, and the third insulating layer 50c. For example, nickel wires, etc, may be used for the first lead wire 52A and the second lead wire 52B.

Figure 5:
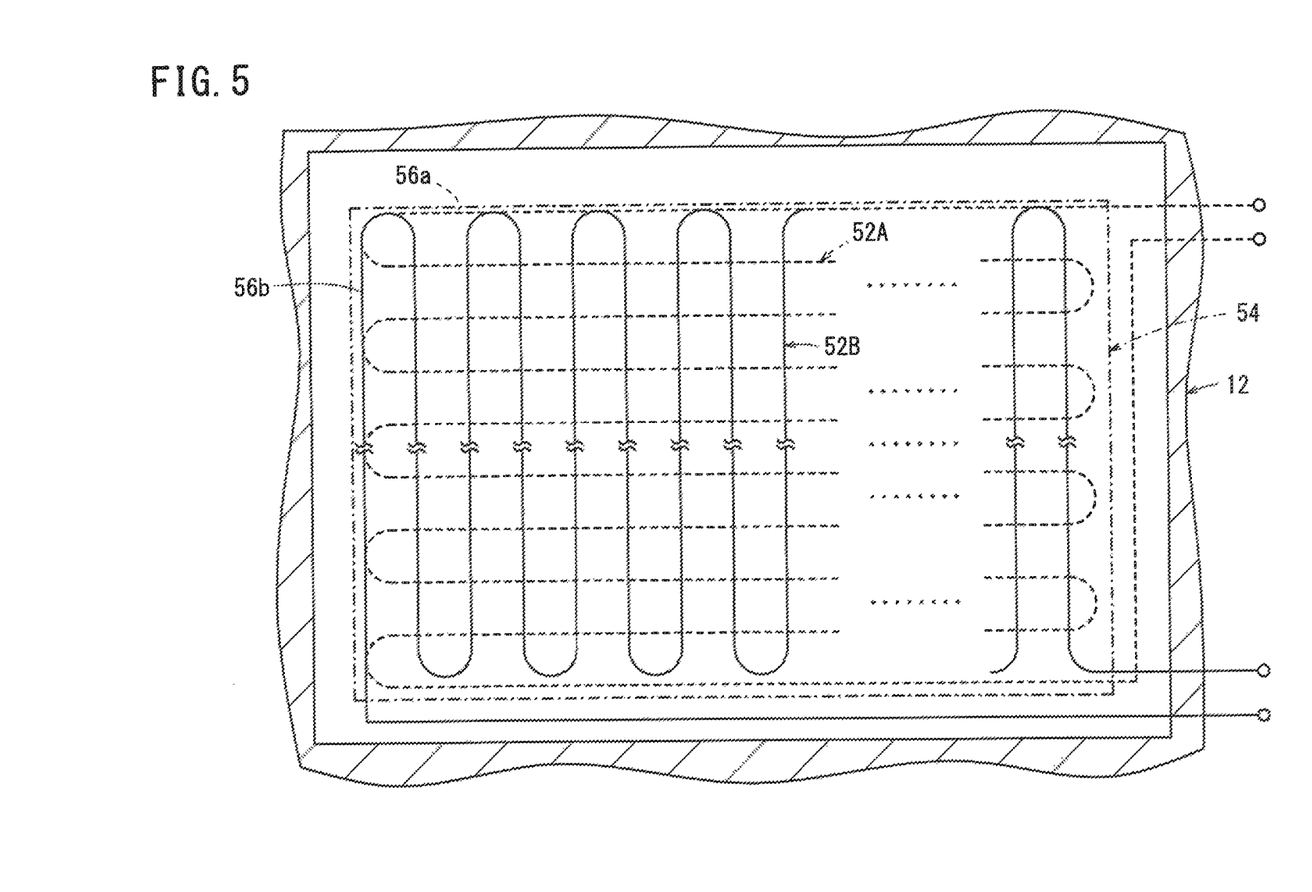
FIG. 5 is a view showing another example of a wiring pattern of the first lead wire and the second lead wire.

The first lead wire 52A and the second lead wire 52B are spread over an entire graphic pattern 54 (see FIGS. 4 and 5) formed by projecting at least the battery module 28 on the bottom of the box body 12. In an example of FIG. 4, both of the first lead wire 52A and the second lead wire 52B are spread in a comb pattern. In particular, comb teeth 56b of the second lead wire 52B (denoted by a solid line) are positioned between the adjacent comb teeth 56a of the first lead wire 52A (denoted by a broken line). It is a matter of course that the orientation of the comb teeth 56a of the first lead wire 52A may be different from the orientation of the comb teeth 56b of the second lead wire 52B, as shown in FIG. 5. FIG. 5 shows an example where the comb teeth 56a of the first lead wire 52A are perpendicular to the comb teeth 56b of the second lead wire 52B. By providing the first lead wire 52A and the second lead wire 52B in a comb pattern, both of the comb teeth 56a of the first lead wire 52A and the comb teeth 56b of the second lead wire 52B also function as resistance wires. In the structure, resistance changes due to contact of active material become large, and it is possible to detect the presence of battery cells having leakage of active material at an early stage.

Further, as shown in FIGS. 1 and 3, a plurality of holes 58a extend through the third insulating layer 50c from the internal space 24 containing the battery module 28 to the second lead wire 52B, and a plurality of holes 58b extend through the second insulating layer 50b from the second lead wire 52B to the first lead wire 52A. The number, diameters and arrangement pitches of the holes 58a, 58b are configured to allow the active material leaked from the battery module 28 to pass through the holes 58a to reach the second lead wire 52B, and pass through the holes 58b to reach the first lead wire 52A.

Therefore, in the battery module 28, if leakage of active material occurs in one or more battery cells 26, the leaked active material passes through the holes 58a of the third insulating layer 50c to reach the second lead wire 52B, or the leaked active material passes through the holes 58a of the third insulating layer 50c and the holes 58b of the second insulating layer 50b to reach the first lead wire 52A, or the leaked active material passes through the holes 58a of the third insulating layer 50c to reach the second lead wire 52B, and thereafter, passes through the holes 58b of the second insulating layer 50b to reach the first lead wire 52A.

If the active material contacts the first lead wire 52A, for example short circuiting between adjacent comb teeth 56a may occur, and erosion (corrosion) or disconnection of the first lead wire 52A may occur in its portion which contacts the active material. If short circuiting occurs between the comb teeth 56a, the resistance value of the first lead wire 52A is decreased as a whole. Further, if a portion of the first lead wire 52A is eroded or disconnected, the resistance value of the first lead wire 52A becomes large as a whole. This phenomenon may occur also in the second lead wire 52B.

In this regard, in the case where resistance values of the first lead wire 52A and the second lead wire 52B are measured, and if there is a change in any one or more of the resistance value R1 of the first lead wire 52A, the resistance value R2 of the second lead wire 52B, and the difference ΔR between the resistance value R1 of the first lead wire 52A and the resistance value R2 of the second lead wire 52B, it is proven that a failure has occurred in one or more battery cells 26 of the battery module 28 due to leakage of active material. The resistance values R1 and R2 of the first lead wire 52A and the second lead wire 52B vary depending on changes in the temperature of the internal space 24 in accordance with temperature characteristics of the constituent material. Therefore, the expected change widths ($\Delta r1$ and $\Delta r2$) in the resistance values R1 and R2 of the first lead wire 52A and the second lead wire 52B due to expected changes in the temperature are determined beforehand, e.g., empirically. In the case where the resistance value R1 of the first lead wire 52A changes (becomes high or low) in excess of the predetermined change width $\Delta r1$, or in the case where the resistance value R2 of the second lead wire 52B changes (becomes high or low) in excess of the predetermined change width $\Delta r2$, it is determined that a failure has occurred in one or more battery cells 26 due to leakage of active material. In the case where the difference ΔR between the resistance value R1 of the first lead wire 52A and the resistance value R2 of the second lead wire 52B is considered, since the above described change widths can be absorbed or canceled out, it may be determined that a failure has occurred due to leakage of active material upon detection of the change in the difference ΔR. It is a matter of course that a predetermined threshold value $\Delta r_{th}$ (which may be smaller than the change widths $\Delta r1$ and $\Delta r2$) may be used to determine that a failure has occurred due to leakage of active material upon detection of a change in the difference ΔR equal to or more than the threshold value $\Delta r_{th}$. In this regard, if disconnection or short circuiting occurs at the same time in both of the first lead wire 52A and the second lead wire 52B, there is a concern that no significant change in the difference ΔR between the resistance value R1 and the resistance value R2 can be confirmed. However, since the first lead wire 52A is placed below the second lead wire 52B, in the structure, it is very unlikely that disconnection or short circuiting occurs at the same time in both of the first lead wire 52A and the second lead wire 52B. However, in order to avoid the risk of the delay in the initial response to the occurrence of a failure, in addition to monitoring of difference ΔR between the resistance value R1 and the resistance value R2, it is preferable to monitor the change in the resistance value R1 of the first lead wire 52A and the change in resistance value R2 of the second lead wire 52B concurrently.

The resistance value R1 of the first lead wire 52A can be determined by supplying minute sensing current I1 to the first lead wire 52A to detect the voltage V1 applied between both terminals of the first lead wire 52A, and computing the equation R1=V1/I1. Likewise, the resistance value R2 of the second lead wire 52B can be determined by supplying minute sensing current I2 to the second lead wire 52B to detect the voltage V2 applied between both terminals of the second lead wire 52B, and computing the equation R2=V2/I2.

As described above, in the battery assembly heat insulating container 10 according to the present embodiment, the circuit member 36 for detecting leakage of active material from the battery module 28 is provided at the bottom of the box body 12. In the structure, it is possible to easily detect the presence of battery cells 26 having leakage of active material, and it is possible to realize a failure detection scheme which is different from the scheme of detecting changes in the depth of discharge in each block 30. Consequently, it is possible to detect the presence of battery cells 26 having leakage of active material in real time, and avoid the risk of the delay in the initial response to the occurrence of a failure.

In particular, the first lead wire 52A and the second lead wire 52B are spread over the entire graphic pattern 54 formed by projecting at least the battery module 28 on the bottom of the box body 12. Therefore, it becomes possible to detect that a failure has occurred in one or more battery cells 26 due to leakage of active material reliably, and in real time. In the present embodiment, both of the first lead wire 52A and the second lead wire 52B are spread in a comb teeth pattern, and in particular, the comb teeth 56b of the second lead wire 52B are positioned between the adjacent comb teeth 56a of the first lead wire 52A. Therefore, for example, by determining the pitches of the comb teeth 56a of the first lead wire 52A and the comb teeth 56b of the second lead wire 52B to be equal to or less than twice the arrangement pitch of the battery cells 26, the interval between the comb teeth 56a of the first lead wire 52A and the comb teeth 56b of the second lead wire 52B that are adjacent to one another in a plan view becomes equal to or less than the arrangement pitch of the battery cells 26. In the structure, even if a failure occurred in only one battery cell 26 due to leakage of active material, it becomes possible to detect the battery cell 26 having the failure reliably, and in real time. It is a matter of course that the same advantages can be obtained by adopting an arrangement where the orientation of the comb teeth 56a of the first lead wire 52A is different from the orientation of the comb teeth 56b of the second lead wire 52B as shown in FIG. 5.

In the above described example, the two lead wires (first lead wire 52A and second lead wire 52B) are used. Alternatively, only one lead wire (first lead wire 52A or second lead wire 52B) may be used, or three or more lead wires may be used.

Next, the battery assembly control device according to the present embodiment (hereinafter referred to as the control device 100) will be described with reference to FIGS. 6 to 9.

Figure 6:
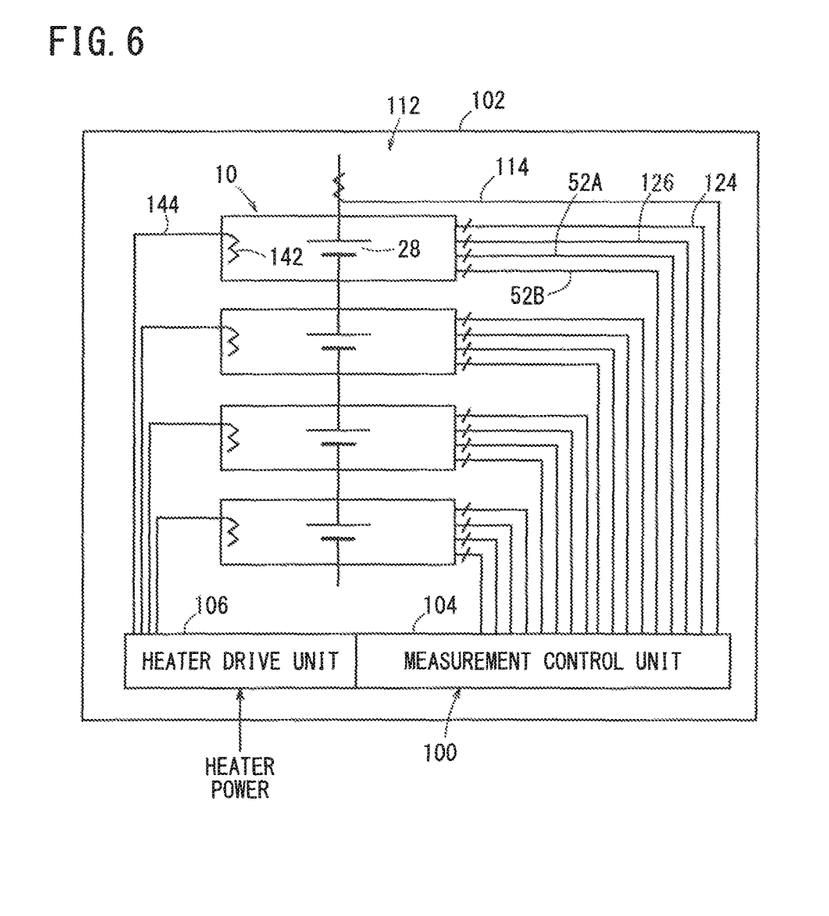
FIG. 6 is a diagram showing structure of a battery assembly control device and a battery module string according to the embodiment of the present invention.
Figure 7:
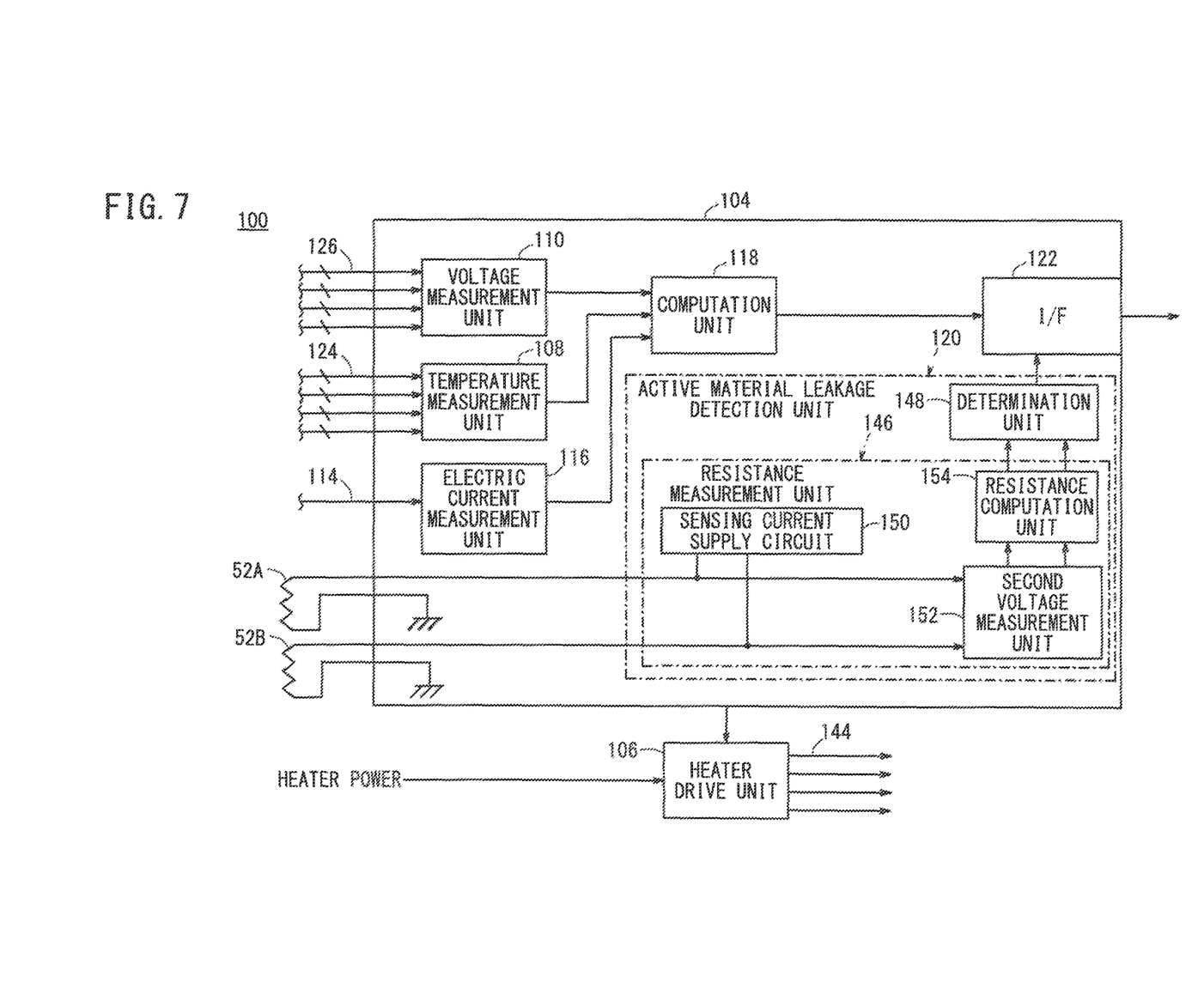
FIG. 7 is a block diagram showing structure of the battery assembly control device according to the embodiment of the present invention.

As shown in FIG. 6, the control device 100 is placed in a frame 102, and as main components, includes a measurement control unit 104 and a heater drive unit 106. As shown in FIG. 7, the measurement control unit 104 includes a temperature measurement unit 108 for measuring the operating temperature T and a voltage measurement unit 110 for measuring the operating voltage V for each battery module 28, an electric current measurement unit 116 for measuring the electric current of a battery module string 112 formed by connecting the plurality of battery modules 28 in series through an electric current measurement line 114, a computation unit 118 for determining the discharge cut off voltage, the charge cut off voltage, etc., based on measurement results from the temperature measurement unit 108, the voltage measurement unit 110, and the electric current measurement unit 116, an active material leakage detection unit 120 for detecting leakage of active material from the battery module 28, and an interface 122 for sending signals to/receiving signals from the outside.

The temperature measurement unit 108 measures the operating temperature T of each of the battery modules 28 based on detection values sent through the temperature measurement lines 124 from temperature sensors (not shown) provided for the battery modules 28, respectively. For example, the temperature sensors use thermocouples, or utilize changes in the electric resistance due to the temperature.

Preferably, the voltage measurement unit 110 can measure the voltage for each of the blocks 30 in the battery module 28. This is aimed to perform measurement accurately, and to reliably prevent excessive electric charging and excessive electric discharging.

Figure 8:
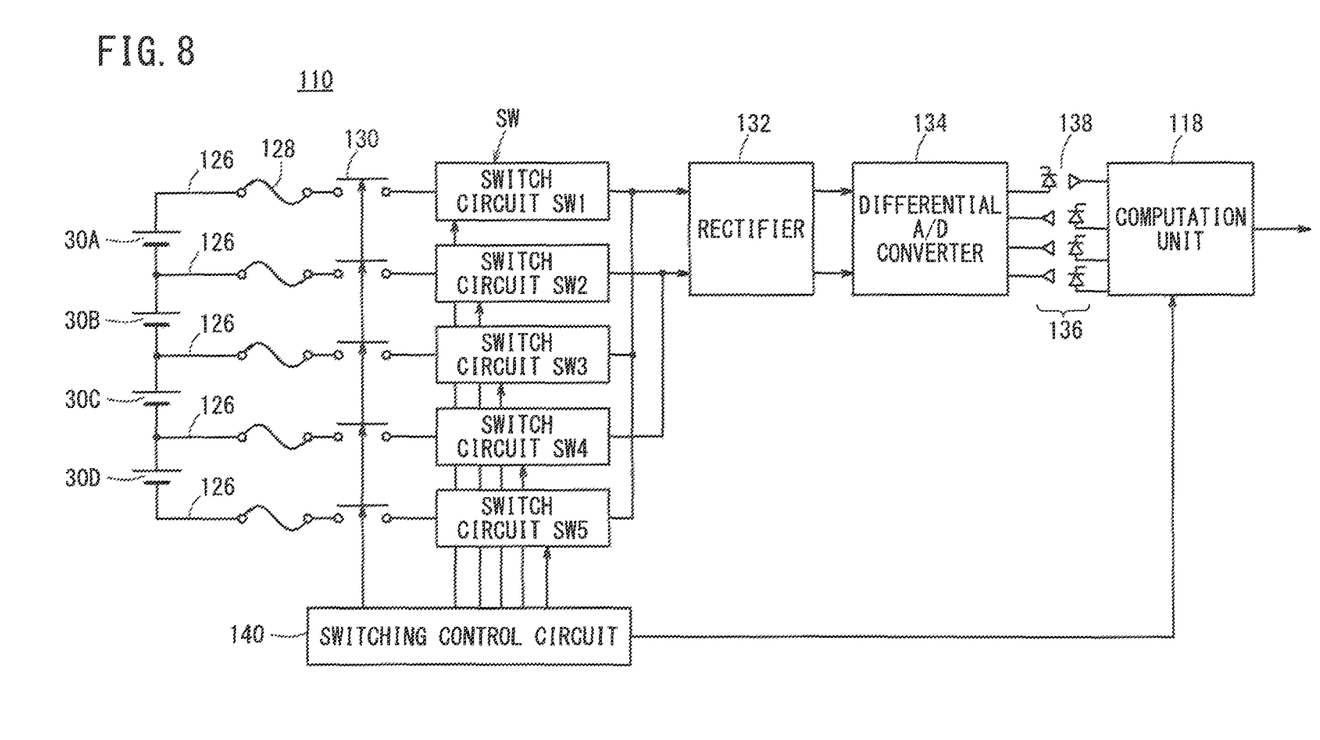
FIG. 8 is a circuit diagram showing structure of a voltage measurement unit of a measurement control unit in the control device.

An example of circuit structure corresponding to one battery module 28 will be explained as circuit structure of the voltage measurement unit 110. As shown in FIG. 8, the circuit structure includes five voltage measurement lines 126 including voltage measurement lines 126 connected to both ends (one end and the other end) of four blocks 30 (first block 30A to fourth block 30D) connected in series and voltage measurement lines 126 connected to nodes between the blocks 30, fuses 128 connected in series with the corresponding voltage measurement lines 126, relays 130 which are turned on in conjunction with measurement of the voltage, switch circuits SW (first switch circuit SW1 to fifth switch circuit SW5) for selecting the voltage measurement line 126 for each block, a rectifier 132 for rectifying a signal supplied per each block to convert the signal into a voltage signal of substantially direct electric current, a differential A/D converter 134 for converting the voltage signal from the rectifier 132 into, e.g., a 12-bit digital signal (voltage value for each block), a digital signal photo-coupler array 136 for transmitting the digital signal from the differential A/D converter 134 to the computation unit 118 while maintaining predetermined withstand voltage, a sign bit photo-coupler 138, and a switching control circuit 140 for performing ON/OFF control of the relays 130 and the switch circuits SW to output a signal corresponding to switch timing of the switch circuits SW, to the computation unit 118. For example, each of the switch circuits SW may comprise a metal oxide semiconductor field-effect transistor for power having internal avalanche diodes connected in anti-parallel to each other.

For example, in the case of sending voltage values of the first block 30A to the fourth block 30D to the computation unit 118 by turns, firstly, the relay 130 is turned on, and then, both of the first switch circuit SW1 and the second switch circuit SW2 are turned on. This switch timing is transmitted to the computation unit 118, and a signal indicating the "positive" sign bit is transmitted from the computation unit 118 to the differential A/D converter 134 through the photo-coupler 138. When the first switch circuit SW1 and the second switch circuit SW2 are turned on, the voltage applied between both terminals of the first block 30A is supplied to the differential A/D converter 134 through the rectifier 132, and directly converted into a digital signal. The digital signal is transmitted to the computation unit 118 through the photo-coupler array 136.

Thereafter, while maintaining the ON state of the second switch circuit SW2, the first switch circuit SW1 is turned off, and the third switch circuit SW3 is turned on. This switch timing is transmitted to the computation unit 118. This time, a signal indicating the "negative" sign bit is transmitted from the computation unit 118 to the differential A/D converter 134 through the photo-coupler 138. Since the second switch circuit SW2 and the third switch circuit SW3 are turned on, this time, the voltage applied between both terminals of the second block 30B is supplied to the differential A/D converter 134 through the rectifier 132, and converted into a digital signal. Then, the sign is inverted (converted into a positive voltage value), and the resulting signal is transmitted to the computation unit 118 through the photo-coupler array 136. Then, in the same manner, the voltage applied between both terminals of the third block 30C, and the voltage applied between both terminals of the fourth block 30D are converted into digital signals, respectively, and the digital signals are transmitted to the computation unit 118.

For the brevity of explanation, the circuit structure shown in FIG. 8 corresponds to one battery module 28. As in the case of the present embodiment, in the case where one battery module string 112 comprising two or more battery modules 28 connected in series should be used, the numbers of the fuses 128, the relays 130, and the switching circuits SW are equal to the number calculated by multiplying the number of the battery modules 28 included in one battery module string 112 by the number of blocks 30 included in one battery module 28. Also, the fuses 128, the relays 130, and the switching circuits SW should be connected respectively to implement ON/OFF control of the relays 130 for each battery module, and to implement ON/OFF control of the switch circuits SW for each block.

The computation unit 118 determines the discharge cut off voltage and the charge cut off voltage for each of the four battery modules 28 by turns.

Specifically, at the time of electric discharging, based on the operating temperature T measured by the temperature measurement unit 108 and the electric discharging current $I_d$ measured by the electric current measurement unit 116, the internal resistance R of the battery module 28, the temperature coefficient $K_t$ (subject to change depending on the operating temperature T), the computation unit 118 calculates the discharge cut off voltage $V_L$ using the following equation (1) for comparison with the operating voltage V measured by the voltage measurement unit 110.

$$V_L = V_o \times n - I_d \times R \times K_t \qquad (1)$$

where $V_o$ denotes open circuit voltage of the battery cell 26 immediately before shortage of sodium occurs at the cathode ($V_o$ is approximately 1.82 V), and n denotes the number of battery cells 26 included in the block 30.

Then, after the following relational inequality (2) satisfied, it is determined that electric discharging has been completed (end of electric discharging), and a signal for finishing electric discharging of the battery cells 26 is generated, and outputted.

$$V_L > V \qquad (2)$$

Further, at the time of electric charging, based on the charging current $I_c$ measured by the electric current measurement unit 116 and the internal resistance R of the battery module 28, charge cut off voltage $V_H$ is determined from the following computation equation (3) for comparison with the operating voltage V measured by the voltage measurement unit 110.

$$V_H = (V_I + \alpha) \times n - I_c \times R \qquad (3)$$

where $V_I$ denotes open circuit voltage of the battery cell 26 at the end of electric charging ($V_I$ is approximately 2.075 V), n denotes the number of the battery cells 26 included in the block 30, and a denotes polarization resistance produced at the end of electric charging ($\alpha$ is approximately 0.05 to 0.15 V). That is, the cut off voltage $V_H$ is calculated considering the polarization resistance based on the theoretical open circuit voltage at the end of electric charging as the NaS battery.

Then, after the following relational inequality (4) is satisfied, it is determined that electric charging has been completed (end of electric charging), and a signal for finishing electric charging of the battery cells 26 is generated, and outputted.

$$V_H < V \qquad (4)$$

Determination to prohibit or stop electric charging or electric discharging is made based on the measurement values of the measured temperature, voltage, and electric current to operate the NaS battery further reliably.

Also in the temperature measurement unit 108 as described above, it is preferable to connect the differential A/D converter 134, the photo-coupler array 136, etc. as in the case of the voltage measurement unit 110.

In the measurement control unit 104, measurement values (data) of the temperature, voltage, and electric current measured by the temperature measurement unit 108, the voltage measurement unit 110, and the electric current measurement unit 116 are supplied to the computation unit 118, and sent to, e.g., a remote monitoring device through the interface 122 and the external cable (including the network).

As shown in FIGS. 6 and 7, the heater drive unit 106 includes a relay comprising, e.g., a semiconductor element having the sufficient capacity enough to withstand the electrical current flowing through a heater 142 (load), normally at the degree of several kW. Using the relay, the heater drive unit 106 is configured to be connected to/disconnected from heater power supply lines 144 to supply the heater power/stop supply of the heater power to the heater 142. It is preferable to provide a fuse in series with the relay for protection of devices and electric cables in the event of short-circuiting in the heater.

The heater drive unit 106 implements ON/OFF control of the heaters 142 by supplying heater power or stopping supply of heater power to the heaters 142 through the heater power supply lines 144, in accordance with a heater control signal (e.g., contact signal) outputted from the measurement control unit 104 in accordance with a predetermined time schedule. In this example, the heater 142 is made up of the bottom surface heater wire 44 (5.6 kW) described above and an unillustrated side surface heater wire (1.8 kW), both of which can be controlled independently, and provided for each of the battery modules 28.

Each of the bottom surface heaters and each of the side surface heaters repeat cycles including an ON period and an OFF period having the same length with a phase shift ⅙ cycle. By this heater control, the operating temperature of the NaS battery is kept within a desired temperature range, and consumed electrical energy is substantially balanced between two lines of the three-phase three-wire system alternating current power supply.

Preferably, the active material leakage detection unit 120 can detect leakage of active material for each of the battery modules 28 based on at least one of the resistance value R1 of the first lead wire 52A, the resistance value R2 of the second lead wire 52B, and the difference $\Delta R$ between the resistance value R1 and the resistance value R2. This is aimed to avoid the risk of the delay in the initial response to the occurrence of a failure.

As an example of circuit structure corresponding to one battery module 28 will be explained as circuit structure of the active material leakage detection unit 120. As shown in FIG. 7, the circuit structure includes a resistance measurement unit 146 for measuring resistance values R1 and R2 of the first lead wire 52A and the second lead wire 523, and a determination unit 148 for determining whether there is a failure due to leakage of active material based on changes in the resistance values R1 and R2 of the first lead wire 52A and the second lead wire 523, and the difference $\Delta R$ between the resistance value R1 and the resistance value R2.

The resistance measurement unit 146 includes a sensing current supply circuit 150 for supplying minute sensing current I1 to the first lead wire 52A and minute sensing current I2 to the second lead wire 523, a second voltage measurement unit 152 for measuring the voltage V1 applied between both terminals of the first lead wire 52A and the voltage V2 applied between both terminals of the second lead wire 52B, and a resistance computation unit 154 for calculating the resistance value R1 of the first lead wire 52A and the resistance value R2 of the second lead wire 52B based on the voltage values V1 and V2 from the second voltage measurement units 152 and the sensing current values I1 and I2. It should be noted that the other terminals of the first lead wire 52A and the second lead wire 52B are connected to the ground GND, and have the ground potential.

Figure 9:
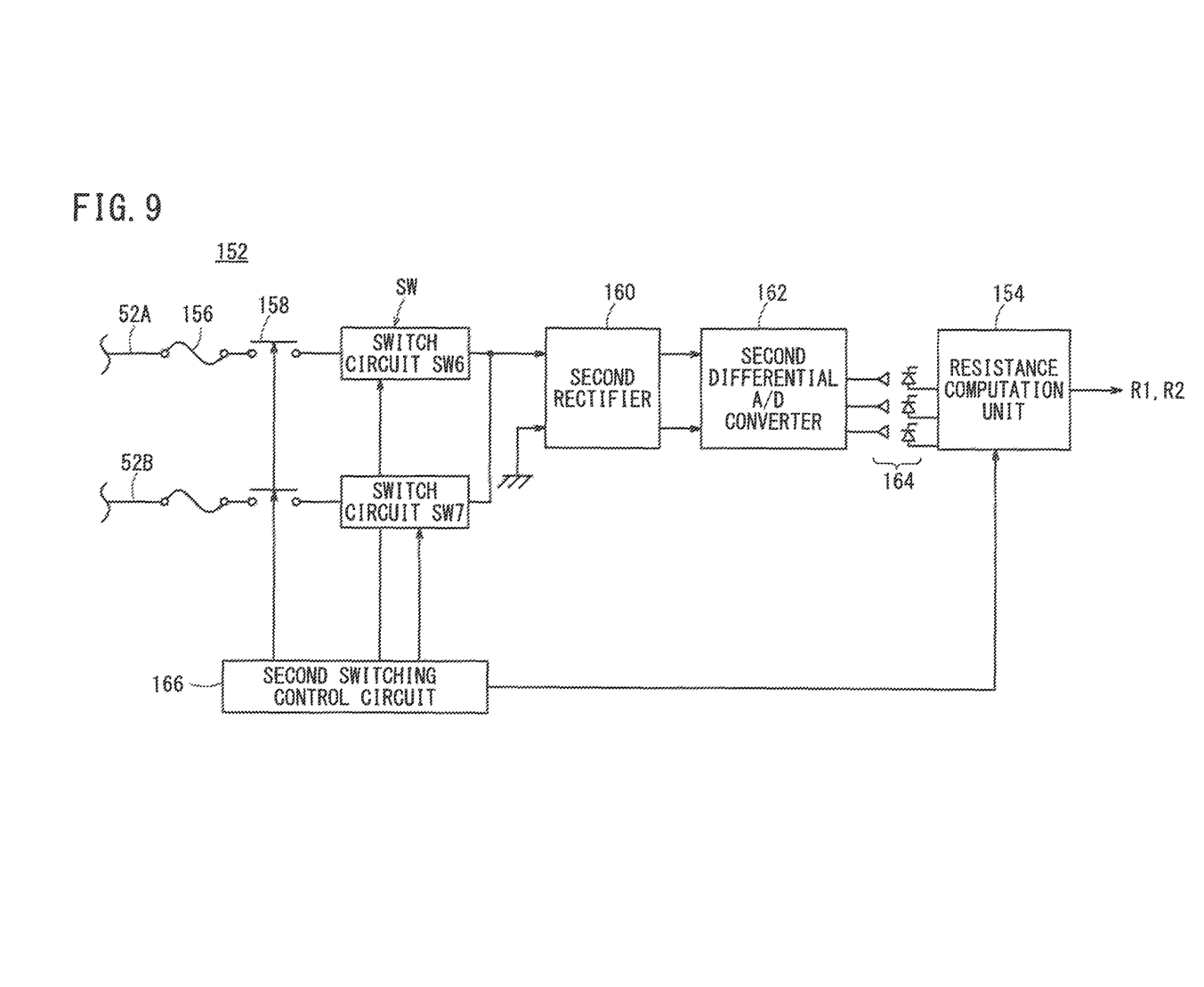
FIG. 9 is a circuit diagram showing structure of a second voltage measurement unit of an active material leakage detection unit of the control device.

For example, as shown in FIG. 9, the second voltage measurement unit 152 includes second fuses 156 connected to one end of the first lead wire 52A and one end of the second lead wire 52B in series respectively, second relays 158 which are turned on in conjunction with measurement of the voltage, switch circuits SW (sixth switch circuit SW6 and seventh switch circuit SW7) for selecting the first lead wire 52A and the second lead wire 52B by turns, a second rectifier 160 for rectifying a signal supplied per each lead wire to convert the signal into a voltage signal of substantially direct electric current, a second differential A/D converter 162 for converting the voltage signal from the second rectifier 160 into, e.g., a 12-bit digital signal (voltage value for each lead wire), a second digital signal photo-coupler array 164 for transmitting the digital signal from the second differential A/D converter 162 to the resistance computation unit 154 while maintaining predetermined withstand voltage, and a second switching control circuit 166 for performing ON/OFF control of the second relays 158 and the sixth switch circuit SW6 and the seventh switching circuit SW7. For example, each of the sixth switch circuit SW6 and the seventh switch circuit SW7 may also comprise a metal oxide semiconductor field-effect transistor for power having internal avalanche diodes connected in anti-parallel to each other.

For example, in the case of sending the voltage values of the first lead wire 52A and the second lead wire 52B to the resistance computation unit 154 by turns, firstly, the second relays 158 are turned on, and subsequently, the sixth switch circuit SW6 is turned on. By turning on the sixth switch circuit SW6, the voltage V1 applied between both of the terminals of the first lead wire 52A (the other terminal of the first lead wire 52A has the ground potential) is supplied to the second differential A/D converter 162 through the second rectifier 160, and converted into a digital signal. The digital signal is sent to the resistance computation unit 154 through the second digital signal photo-coupler array 164.

Thereafter, the sixth switch circuit SW6 is turned off, and the seventh switch circuit SW7 is turned on. This time, the voltage V2 applied between both terminals of the second lead wire 52B (the other terminal of the second lead wire 52B has the ground potential) is supplied to the second differential A/D converter 162 through the second rectifier 160, and converted into a digital signal. The digital signal is sent to the resistance computation unit 154 through the second digital signal photo-coupler array 164.

In the circuit structure shown in FIG. 9, for the brevity of explanation, the circuit structure corresponds to one battery module 28. As in the illustrated embodiment, in the case where one battery module string 112 comprising two or more battery modules 28 connected in series should be used, the numbers of the second fuses 156, the second relays 158, and the switching circuits SW are equal to the number calculated by multiplying the number of the battery modules 28 included in one battery module string 112 by the number of lead wires included in one battery module 28. Also, the second fuses 156, the second relays 158, and the switching circuits SW should be connected respectively to implement ON/OFF control of the second relays 158 for each battery module, and to implement ON/OFF control of the switch circuits SW for each lead wire.

The resistance computation unit 154 computes the resistance value R1 of the first lead wire 52A based on the voltage value V1 of the first lead wire 52A (voltage applied between both terminals of the first lead wire 52A) from the second voltage measurement unit 152, and the sensing current value I1 supplied to the first lead wire 52A, and computes the resistance value R2 of the second lead wire 52B based on the voltage value V2 (voltage applied between both terminals of the second lead wire 52B) from the second voltage measurement unit 152 and the sensing current value I2 supplied to the second lead wire 52B. These resistance values R1 and R2 are supplied to the determination unit 148.

The determination unit 148 stores the resistance value R1 of the first lead wire 52A and the resistance value R2 of the second lead wire 52B when operation of each battery module 28 is started for the first time, as reference resistance values Ra and Rb, respectively, in a memory. Further, as described above, the memory stores the expected change widths ($\Delta$r1 and $\Delta$r2) in the resistance values R1 and R2 of the first lead wire 52A and the second lead wire 52B due to expected changes in the temperature and a threshold value $\Delta r_{th}$ used for comparison with the difference $\Delta$R.

Further, based on the resistance values R1 and R2 supplied form the resistance computation unit 154 in real time, and reference resistance values Ra and Rb, the determination unit 148 calculates the resistance change $\Delta$R1 (=|R1−Ra|) of the first lead wire 52A, the resistance change $\Delta$R2 (=|R2−Rb|) of the second lead wire 52B, and the difference $\Delta$R (|R1−R2|) between the resistance value R1 and the resistance value R2.

Further, if any one or more of the following relational equations (a) to (c) are satisfied, the determination unit 148 determines that leakage of active material has occurred in one or more battery cells 26 of the battery module 28, and outputs a leakage detection signal including information of the battery module 28 (module number, etc.).

$\Delta R1 > \Delta r1$              Relational inequality (a):

$\Delta R2 > \Delta r2$              Relational inequality (b):

$\Delta R > \Delta r_{th}$              Relational inequality (c):

The leakage detection signal from the determination unit 148 is sent to, e.g., a remote monitoring device through the interface 122 and the external cable (including the network).

As described above, in the control device 100 according to the embodiment of the present invention, the heat insulating container 10 contains the first lead wire 52A and the second lead wire 52B provided separately from the heater wire 44, the resistance measurement unit 146 for measuring the resistance value R1 of the first lead wire 52A and the resistance value R2 of the second lead wire 52B, and the determination unit 148 for outputting the leakage detection signal indicating the presence of leakage of active material from the battery module 28 if there is a change in the resistance values R1 and R2 measured by the resistance measurement unit 146. Therefore, it is possible to easily detect the presence of battery modules 28 having leakage of active material, and it is possible to realize a failure detection scheme which is different from the scheme of detecting changes in the depth of discharge in each block. Consequently, it is possible to detect the presence of battery modules 28 having leakage of active material in real time, and avoid the risk of the delay in the initial response to the occurrence of a failure.

It is a matter of course that the battery assembly heat insulating container, the battery assembly control device, and the battery assembly failure detection method according to the present invention is not limited to the embodiments described above, and various structure can be adopted without deviating the gist of the present invention.

The invention claimed is:

1. A battery assembly heat insulating container, comprising:
   a battery assembly formed by connecting a plurality of battery cells in series or in parallel;
   a box body containing the battery assembly formed by connecting a plurality of battery cells in series or in parallel, an opening being formed on an upper surface of the box body; and
   a lid body placed on the upper surface of the box body,
   the battery assembly heat insulating container being adapted to provide heat insulation between an external space and an internal space being formed by the box body and the lid body and containing the battery assembly,
   wherein the battery assembly heat insulating container further comprises a circuit member configured to detect leakage of a liquid active material from the battery assembly, the circuit member being provided at a bottom of the box body,
   wherein the circuit member includes a first lead wire provided proximate a bottom surface of the box body stacked on a first insulating layer, a second lead wire stacked on a second insulating layer, a third insulating layer, an internal space containing the battery assembly provided above the third insulating layer, and holes defined in the third and second insulating layers respectively, configured to pass the liquid active material leaked from the battery assembly therethrough to reach the second lead wire and the first lead wire, the leaked active liquid material thereby being detected.

2. The battery assembly heat insulating container according to claim 1, wherein the first lead wire and the second lead wire each include comb teeth spread in a comb teeth pattern.

3. The battery assembly heat insulating container according to claim 2, wherein the comb teeth of the second lead wire are positioned between the comb teeth of the first lead wire.

4. The battery assembly heat insulating container according to claim 2, wherein an orientation of the comb teeth of the first lead wire is different from an orientation of the comb teeth of the second lead wire.

5. The battery assembly heat insulating container according to claim 1, wherein the first and second lead wires are wired separately from a heater wire provided on the bottom surface of the box body.

6. The battery assembly heat insulating container according to claim 1, wherein a resistance of at least one of the first and second lead wires is adapted to change upon contact with the liquid active material.

* * * * *